(12) United States Patent
Hofmann et al.

(10) Patent No.: US 12,496,939 B2
(45) Date of Patent: Dec. 16, 2025

(54) VEHICLE SEAT

(71) Applicant: BROSE FAHRZEUGTEILE SE & CO. KOMMANDITGESELLSCHAFT, COBURG, Coburg (DE)

(72) Inventors: Jochen Hofmann, Marktgraitz (DE); Erik Luther, Rohr (DE); Marcel Amstein, Marisfeld (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 125 days.

(21) Appl. No.: 18/251,378

(22) PCT Filed: Oct. 28, 2021

(86) PCT No.: PCT/EP2021/080007
§ 371 (c)(1),
(2) Date: Jun. 12, 2023

(87) PCT Pub. No.: WO2022/096366
PCT Pub. Date: May 12, 2022

(65) Prior Publication Data
US 2024/0017646 A1 Jan. 18, 2024

(30) Foreign Application Priority Data
Nov. 3, 2020 (DE) .............. 10 2020 128 906.5

(51) Int. Cl.
B60N 2/18 (2006.01)
B60N 2/10 (2006.01)
(Continued)

(52) U.S. Cl.
CPC ............... *B60N 2/10* (2013.01); *B60N 2/20* (2013.01); *B60N 2/18* (2013.01); *B60N 2/1803* (2013.01); *B60N 2/1839* (2013.01); *B60N 2/62* (2013.01)

(58) Field of Classification Search
CPC ...... B60N 2/18; B60N 2/1803; B60N 2/1839; B60N 2/62
See application file for complete search history.

(56) References Cited

U.S. PATENT DOCUMENTS 3,632,166 A * 1/1972 Lohr ............... B60N 2/1896
297/367 R
5,171,062 A * 12/1992 Courtois ........... B60N 2/0284
297/340
(Continued)

FOREIGN PATENT DOCUMENTS

| CN | 103587440 A | 2/2014 |
|---|---|---|
| CN | 204488582 U | 7/2015 |

(Continued)

OTHER PUBLICATIONS

ISA European Patent Office, International Search Report Issued in Application No. PCT/EP2021/080007, Feb. 7, 2022, WIPO, 4 pages.

(Continued)

*Primary Examiner* — Syed A Islam
(74) *Attorney, Agent, or Firm* — McCoy Russell LLP

(57) ABSTRACT

It is provided a vehicle seat, with a backrest which is rigidly coupled to a seat part so that a pivotal movement of the backrest about a rear pivot axis, via which an inclination of the backrest can be adjusted, always is accompanied by a corresponding pivotal movement of the seat part. There is (Continued)

provided a pan adjusting device via which a seat pan part can be pivoted relative to the seat part about a seat part pivot axis.

12 Claims, 2 Drawing Sheets

(51) Int. Cl.
*B60N 2/20* (2006.01)
*B60N 2/62* (2006.01)

(56) References Cited

U.S. PATENT DOCUMENTS

| | | | |
|---|---|---|---|
| 6,578,917 | B1 | 6/2003 | Aubert et al. |
| 2008/0048477 | A1 | 2/2008 | Ujimoto et al. |
| 2019/0299818 | A1* | 10/2019 | Sasaki ............... B60N 2/02246 |
| 2022/0024357 | A1 | 1/2022 | Lohar et al. |

FOREIGN PATENT DOCUMENTS

| | | |
|---|---|---|
| CN | 110316029 A | 10/2019 |
| CN | 110481392 A | 11/2019 |
| DE | 2027646 A1 | 1/1971 |
| DE | 2028135 A1 | 2/1971 |
| DE | 19853156 A1 | 5/2000 |
| DE | 102018009665 B3 | 2/2020 |
| GB | 1307749 A | 2/1973 |
| WO | 9832627 A1 | 7/1998 |

OTHER PUBLICATIONS

China National Intellectual Property Administration, Office Action and Search Report Issued in Application No. 202180074289.X, Jul. 22, 2025, 15 pages. (Submitted with Partial Translation).

* cited by examiner

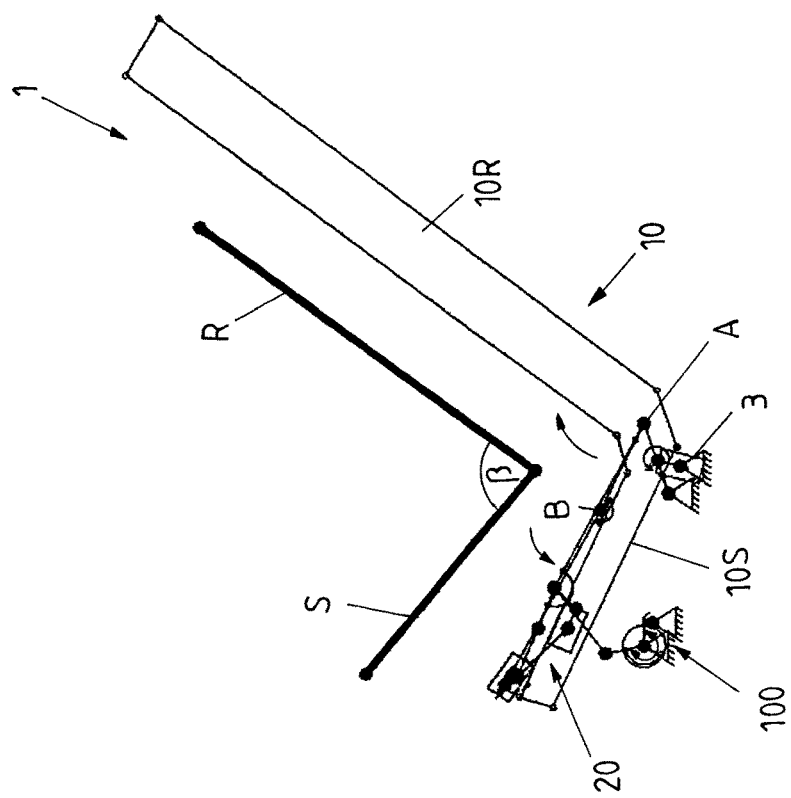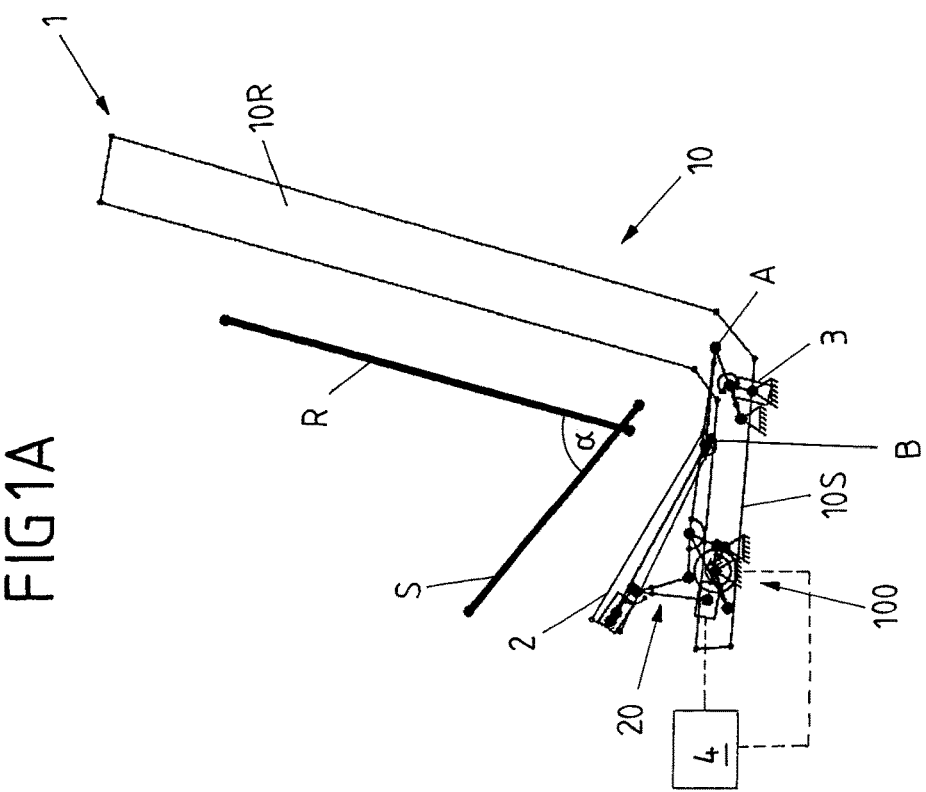

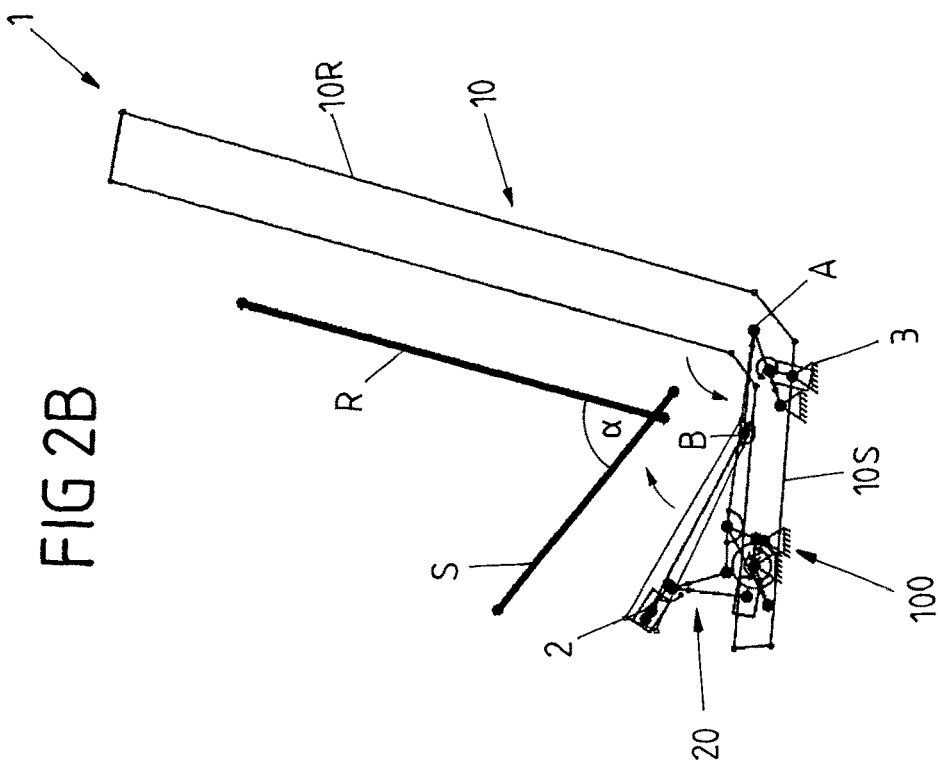
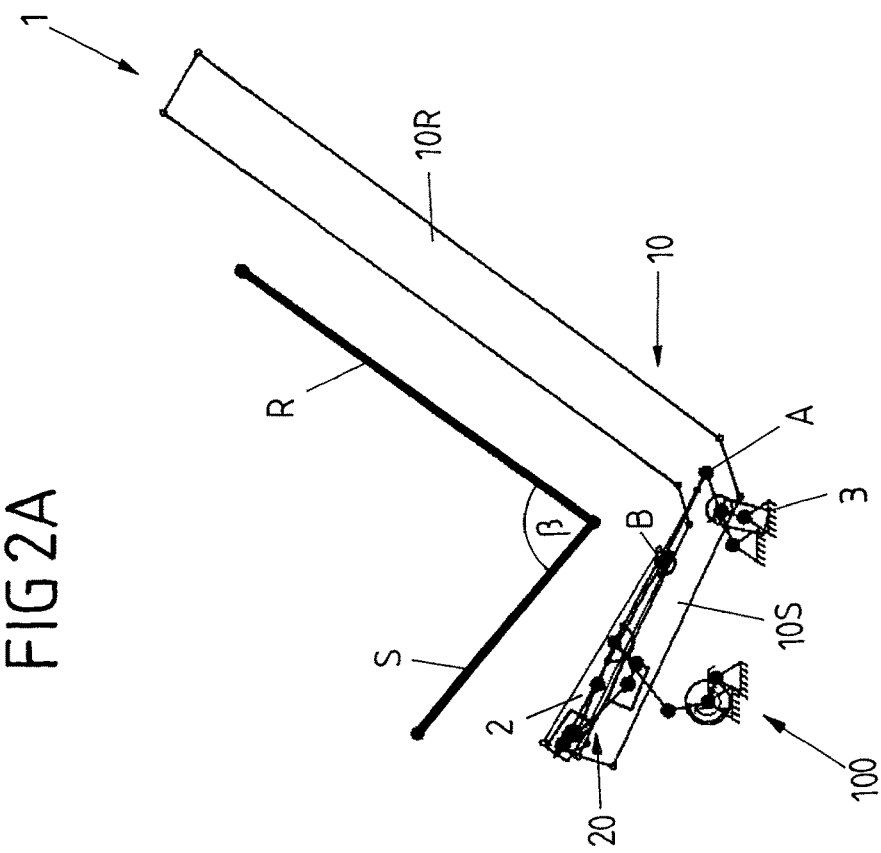

VEHICLE SEAT

CROSS REFERENCE TO RELATED APPLICATIONS

The present application is a U.S. National Phase of International Application No. PCT/EP2021/080007 entitled "VEHICLE SEAT," and filed on Oct. 28, 2021. International Application No. PCT/EP2021/080007 claims priority to German Patent Application No. 10 2020 128 906.5 filed on Nov. 3, 2020. The entire contents of each of the above-listed applications are hereby incorporated by reference for all purposes.

BACKGROUND

The disclosure relates to a vehicle seat in which a seat part and a backrest are rigidly coupled to each other.

Vehicle seats in which a seat part and a backrest are rigidly coupled to each other are widely known from practice. Here, a rigid coupling between the backrest and the seat part is provided for example for cost and weight reasons so that a fitting between the seat part and the backrest can be omitted. It is then perhaps possible to adjust an inclination of the backrest, but this is always accompanied by the seat part pivoting at the same time. Thus, the inclination of the seat part and in particular of a seating surface defined on the seat part no longer can be adjusted independently of an inclination of the backrest. This allows to omit a partly extremely complex and in particular crash-sensitive assembly around a detent or rotary fitting for an independent adjustability between seat part and backrest. However, this involves the acceptance of quite significant disadvantages in terms of comfort.

SUMMARY

Against this background it is the object underlying the proposed solution to provide a vehicle seat improved in this respect, in particular a vehicle seat without a fitting.

This object is achieved with a vehicle seat as described herein.

A proposed vehicle seat comprises a seat part on which a seat pan part defining a position of a seating surface on the vehicle seat is adjustably arranged. The vehicle seat also comprises a backrest which is rigidly coupled to the seat part so that a pivotal movement of the backrest about a rear pivot axis, relative to a seat longitudinal axis, via which an inclination of the backrest can be adjusted, always is accompanied by a corresponding pivotal movement of the seat part (about the same rear pivot axis). In addition, there is provided a pan adjusting device via which the seat pan part can be pivoted relative to the seat part about a seat part pivot axis.

By means of the seat pan part pivotable about an additional seat part pivot axis, a seating position can more specifically and more comfortably be adapted for a seat user also in the case of a vehicle seat in which backrest and seat part are rigidly coupled to each other.

For example, the seat part pivot axis, based on an extension of the vehicle seat along a seat longitudinal axis, is provided in a rear third of the seat part. The seat part pivot axis for the seat pan part and the rear pivot axis for the backrest can coincide in principle. In one design variant, the seat part pivot axis is spaced apart from the rear pivot axis in order to be able to more specifically adjust a bearing region for a thigh of a seat user in its position with respect to the backrest via an adjustment of the seat pan part.

In principle, the seat part pivot axis of the seat pan part can coincide with a hip point (short: H-point) specified by the vehicle seat or include the H-point or be offset only slightly from the H-point.

Via an electronic and/or mechanical coupling, the pan adjusting device can be actuated in dependence on a pivotal movement of the backrest for a compensating adjustment of the seat pan part relative to the seat part to be pivoted at the same time. The compensating adjustment of the seat pan part can aim towards (partly or completely) maintaining the position of the seating surface taken before the beginning of the pivotal movement of the backrest. On such a vehicle seat, an adjustment of the seat pan part relative to the seat part consequently can be effected for example in dependence on a pivotal movement of the backrest, namely in such a way that during a pivotal movement of the backrest the seat part rigidly coupled therewith is also pivoted to the same extent, but for the pivotal movement of the seat part the seat pan part is directly, i.e. while carrying out the pivotal movement of the backrest, adjusted in the opposite direction so that the orientation of the seating surface in space substantially is maintained for a seat user of the vehicle seat. Thus, merely the inclination of the backrest apparently is changed for the seat user, whereas via the pan adjusting device actuated in the opposite direction, the thighs of the seat user resting on the seating surface substantially or exactly include the same angle to the horizontal or to the vehicle floor of the vehicle in which the vehicle seat is arranged.

A coupling of the pan adjusting device to a device of the vehicle seat for adjusting the inclination of the backrest consequently can be adapted to actuate the pan adjusting device for carrying out a compensating movement by the seat pan part in order to (at least partly, in particular for the most part or even completely) compensate the pivoting of the seat part—taking place as a result of the rigid coupling between the backrest and the seat part. In particular, it can thereby be provided that the seating surface of the vehicle seat substantially or exactly remains in a position originally taken with respect to the horizontal (i.e. a position taken before the beginning of the pivotal movement of the backrest). The coupling between the pan adjusting device and the device for adjusting the inclination of the backrest in particular can be configured to adjust the seat pan part relative to the seat part to the extent in which the backrest —together with the seat part—is pivoted about the rear pivot axis. The position of the seating surface of the vehicle seat specified via the seat pan part consequently is changed via the adjustment of the seat pan part with respect to the seat part to the extent in which the backrest is pivoted about the rear pivot axis.

A device for adjusting the inclination of the backrest for example can be configured to realize a so-called rocking adjustment kinematics. For this purpose, the device can comprise for example a dual-joint adjuster, i.e. an adjusting device comprising adjusting parts adjustable about at least two joint axes for transmitting an adjusting force and for generating the intended adjusting movements.

A rear pivot axis for pivoting the backrest here refers to a pivot axis located in a transition region between the backrest and the seat part, based on a seat longitudinal direction, so that the inclination of the backrest can be adjusted by pivoting abut such a (rear) pivot axis in order to specify different positions of use for a seat user of the vehicle seat. When an inclination of the seat pan part with respect to the seat part can be adjusted via the pan adjusting device, the seat pan part can be pivotable about a further pivot axis. With respect to the seat longitudinal direction, the pivot axis for the seat pan part then is arranged for example in front of the rear pivot axis for adjusting the inclination of the backrest and thus forms a front pivot axis.

Via the pan adjusting device, the seat pan part can be adjustable along a first adjustment direction when the backrest is pivoted about the rear pivot axis in a first pivoting direction, and conversely can be adjustable along a second adjustment direction when the backrest is pivoted about the rear pivot axis in an opposite second pivoting direction. Then, for example, the seat pan part is lifted via the pan adjusting device and inclined towards the backrest, when the backrest is pivoted forwards in a first pivoting direction. Conversely, the seat pan part is lowered via the pan adjusting device and inclined away from the backrest, when the backrest is pivoted rearwards.

In principle, the intended coupling between the pan adjusting device and a device of the vehicle seat for adjusting the inclination of the backrest can (also) be of the mechanical type. To save weight and costs, however, one design variant in any case provides that the pan adjusting device comprises at least one drive motor for a power-operated adjustment of the seat pan part, and there is provided an electronic coupling via an electronic control system. Via a motorized pan adjusting device and electronic linking of an actuation of the pan adjusting device with an inclination adjustment of the backrest, a compensating movement can be realized comparatively easily and extremely comfortably for a seat user.

Since the proposed solution allows to achieve a compensating movement via the seat pan part adjusted in dependence on the backrest, a fitting can be omitted at the vehicle seat, via which the backrest would be adjustable relative to the seat part without a seat user having to do without particular comfort functions. A vehicle seat without fittings can involve considerable cost advantages, typically requires less installation space and also is easier to mount.

For example, the vehicle seat comprises at least one frame part that forms both part of a backrest frame of the backrest and part of a seat substructure of the seat part. In accordance with the proposed solution, the backrest and the seat part can be designed as separate components or assemblies and can merely be rigidly fixed to each other, so that a relative movement between backrest and seat part is not intended. With a one-part design of at least part of the backrest frame of the backrest with a part of a seat substructure of the seat part on a frame part, additional advantages in terms of mounting and costs can be achieved, however, for example in particular with regard to a one-part design of a seat part and backrest foam and/or trim for the vehicle seat, which then is possible more easily. In a development, the vehicle seat comprises a one-part seat frame which forms both the backrest frame and a seat substructure of the seat part carrying the adjustable seat pan part.

In principle, for example, the seat substructure can also have a frame structure for weight optimization. Alternatively or additionally, the backrest frame and/or the seat substructure are designed as a tubular frame. In one design variant, the frame part furthermore can be made of a fiber composite material.

In the proposed solution, a seat pan of the vehicle seat can be configured as a full pan or half pan. This is secondary to the advantages to be achieved with the proposed solution.

In one design variant, the vehicle seat additionally can comprise a seat height adjusting device. This seat height adjusting device can be electronically and/or mechanically be coupled to the pan adjusting device and/or to a device of the vehicle seat for adjusting the inclination of the backrest. By means of an additional coupling, for example via an electronic control system in a seat height adjusting device to be actuated by a motor, an adaptation of a seating position for a seat user can be adjusted even more finely and better adapted to the needs of the seat user. For example, the seat height adjusting device is designed with a three-joint adjuster.

In one design variant, a proposed vehicle seat is designed as a reclining seat and/or as a seat having an integrated seat belt.

The proposed solution furthermore comprises a vehicle with at least one design variant of a proposed vehicle seat.

BRIEF DESCRIPTION OF THE DRAWINGS

The attached Figures by way of example illustrate possible design variants of the proposed solution.

FIG. 1A shows a design variant of a proposed vehicle seat in a side view and in a first position (of use), comprising a seat frame integrating a backrest frame for a backrest and a seat substructure for a seat part, on which a pan part of a seat pan is arranged so as to be adjustable in its inclination.

FIG. 1B shows the vehicle seat of FIG. 1A with the seat frame in a second position (of use) pivoted rearwards, comprising a lowered seat pan part.

FIGS. 2A-2B show the vehicle seat of FIGS. 1A and 1B in reverse adjustment sequence.

DETAILED DESCRIPTION

FIG. 1A shows a vehicle seat 1 with a frame part in the form of a seat frame 10. In the present case, the seat frame 10 integrates a backrest frame for a backrest 10R of the vehicle seat 1 and a seat substructure for a seat part 10S of the vehicle seat 1. Consequently, the seat frame 10 in the present case is of one part design and forms both the backrest 10R and the seat part 10S. When the backrest 10R of the vehicle seat 1 hence is to be varied in its inclination with respect to the horizontal, by pivoting the backrest 10R about a rear pivot axis A, the entire seat frame 10 must be pivoted about the rear pivot axis A and carry out a rocking movement by which the seat part 10S also is pivoted. In order to nevertheless allow a seat user to adjust the inclination of the backrest 10R of the vehicle seat 1, without (noticeably) changing a seating surface defined on the vehicle seat 1 for thighs and buttocks of the seat user, the vehicle seat 1 provides a coupling of a frame part adjuster 100 provided for adjusting the inclination of the backrest 10R with a pan adjusting device 20. The joint adjuster 100 can be a so-called rocking adjuster for realizing a rocking adjustment kinematics. In particular, the joint adjuster 100 can be configured as a dual-joint adjuster.

Via the pan adjusting device 20, a seat pan part 2 pivotally mounted on the seat part 10S about a front seat part pivot axis B (with respect to a seat longitudinal axis and the position of the rear pivot axis A) can be adjusted. The front seat part pivot axis B for the seat pan part 2 here is arranged spaced apart from a seat front and provided in a rear third of the seat part 10S, with respect to a seat longitudinal axis of the vehicle seat 1, so that via the pan adjusting device 20 a front-side end of the seat pan part 2 can be lifted or lowered with respect to the seat part 10S, each by changing an inclination of the seat pan part 2 with respect to the seat part 10S. Since a seat cushion of the vehicle seat 1 is arranged or at least supported on the seat pan part 2, the seat pan part 2 ultimately defines the position of the seating surface on the vehicle seat 1.

Via the pan adjusting device 2, the inclination of the seating surface with respect to the horizontal and the backrest R in principle can be adjusted via a motor drive of the pan adjusting device 2 (i.e. independently of an inclination adjustment of the backrest 10R). In the illustrated design variant, an electronic coupling additionally is provided via an electronic control system 4 between the pan adjusting device 20 and the frame part adjuster 100 or a coupling of the respective motor drive of the pan adjusting device 20 and the frame part adjuster 100.

In this way, a motor drive of the pan adjusting device 20 is automatically actuated for a compensating movement via the electronic control system 4, when merely an inclination adjustment of the backrest 10R is to be effected and for this purpose a motor drive of the frame part adjuster 100 is actuated. For example when the backrest 10R is pivoted rearwards from the starting position shown in FIG. 1A, the pan adjusting device 20 thereby is controlled for lowering of the seat pan part 2 and hence pivoting of the front end of the seat pan part 2 in the direction of the seat part 10S pivoted along with the backrest 10R. To the extent in which the backrest 10R is pivoted rearwards about the rear pivot axis A, the seat pan part 2 consequently is pivoted in the opposite direction about the front seat part pivot axis B towards the seat part via the pan adjusting device 20.

Corresponding to the representation of FIGS. 1A and 1B it can thereby be achieved that, proceeding from a starting position corresponding to FIG. 1A, in which the backrest 10R substantially extends along an extension plane R at an angle α to an extension plane S of the seating surface of the vehicle seat 1, the backrest 1B can be inclined rearwards by a defined amount, without the seating surface also being pivoted rearwards for the seat user to the same extent. Rather, by lowering the seat pan part 2 a compensation of the pivotal movement of the backrest 10R is effected, so that the orientation of the backrest 10R relative to the seating surface is changed and hence the thighs of a seat user can remain aligned identically on the seating surface of the vehicle seat 1, although the seat part 10S is also pivoted together with the backrest 10R. Corresponding to the representation of FIG. 1B, the extension plane R of the backrest 10R then extends at a larger angle β (β>α) relative to the extension plane S of the seating surface of the vehicle seat 1, since the seat pan part 2 has been lowered correspondingly.

The electronic control system 4 consequently controls the pan adjusting device 20 in dependence on an adjustment of the seat frame 10 driven via the frame part adjuster 100 and hence in particular of the backrest 10R about the rear pivot axis A. The electronic control system 4 thus corrects the effects involved in the pivoting of the seat part 10S—and undesired with regard to the seating comfort—, and actuates the seat pan part 2 via the pan adjusting device 20 to perform a compensating adjusting movement, when the backrest 10R is to be changed in its inclination with respect to the seating surface of the vehicle seat 1. A seat user or also another operator who triggers an adjustment at the vehicle seat 1, each must actuate for example only one control switch for adjusting the backrest 10R. The electronic control system 4 automatically performs the corresponding compensation via the motorized adjustment of the seat pan part 2.

As is illustrated with reference to FIGS. 2A and 2B for a reverse adjustment sequence, a corresponding compensating movement via the seat pan part 2 is of course also provided when the backrest 10R is pivoted forwards, controlled via the electronic control system 4. To the extent in which the backrest 10R (together with the seat part 10S) is to be adjusted forwards from a position of use tilted rearwards corresponding to FIG. 2A into a more erect position of use, the seat pan part 2 is pivoted towards the backrest 10R about the front seat part pivot axis B on the seat part 10S and hence lifted.

With reference to FIGS. 1A to 2B it furthermore can also be seen that a seat height adjuster 3 can additionally be provided on the vehicle seat 1. Via the seat height adjuster 3 a seat height of the vehicle seat 1 can be adjusted with respect to a vehicle floor. The seat height adjuster 3 therefor is coupled to the seat frame 10, which comprises the seat part 10S and the backrest 10R and furthermore carries the seat pan part 2. When the seat frame 10 consequently is displaced via the seat height adjuster 3, the seat height thereby is changed on the vehicle seat 1 as a whole. For example, the seat height adjuster 3 is designed as a three-joint adjuster.

The vehicle seat 1 of FIGS. 1A to 2B is designed without fittings. Consequently, no fitting is provided between the backrest 10R and the seat part 10S for changing the relative position between the backrest 10R and the seat part 10S. As a result, possible transmission parts or a transmission shaft for transmitting an adjusting force between two fittings provided on different longitudinal sides of the seat can be omitted. Via the provided electronic coupling between the frame part adjuster 100 and the pan adjusting device 20, the package advantages to be achieved therewith do not involve a loss of comfort and a reduction of possibilities for a seat user to adjust his seating position on the vehicle seat 1.

LIST OF REFERENCE NUMERALS 1 vehicle seat
10 seat frame (frame part)
100 frame part adjuster
10R backrest
10S seat part
2 seat pan part
20 pan adjusting device
3 seat height adjuster
4 electronic control system
A rear pivot axis
B seat part pivot axis
R extension plane of backrest
S extension plane of seating surface
α, β angle

The invention claimed is:

1. A vehicle seat, comprising:
   a seat part on which a seat pan part defining a position of a seating surface of the vehicle seat is adjustably arranged,
   a backrest which is rigidly coupled to the seat part so that a pivotal movement of the backrest about a rear pivot axis, via which an inclination of the backrest can be adjusted, always is accompanied by a corresponding pivotal movement of the seat part, and
   a pan adjusting device configured to pivot the seat pan part relative to the seat part about a seat part pivot axis,
   wherein the pan adjusting device comprises at least one drive motor for a power-operated adjustment of the seat pan part and an electronic control system for controlling the power-operated adjustment of the seat pan part by the at least one drive motor in response to an adjustment of the inclination of the backrest, and
   wherein the electronic control system is configured to drive the at least one drive motor for a compensating movement of the seat pan part relative to the seat part in order to substantially or exactly maintain the position of the seating surface with respect to the horizontal when the inclination of the backrest is adjusted and the seat part thereby pivoted.

2. The vehicle seat according to claim 1, wherein the seat part pivot axis, based on an extension of the vehicle seat along a seat longitudinal axis, is provided in a rear third of the seat part.

3. The vehicle seat according to claim 1, wherein the seat part pivot axis is spaced apart from the rear pivot axis.

4. The vehicle seat according to claim 1, wherein the electronic control system is configured to adjust the seat pan part relative to the seat part to the extent in which the backrest is pivoted about the rear pivot axis.

5. The vehicle seat according to claim 1, wherein the pan adjusting device is configured to adjust the seat pan part along a first adjustment direction when the backrest is pivoted about the rear pivot axis in a first pivoting direction, and to adjust the seat pan part conversely along a second adjustment direction when the backrest is pivoted about the rear pivot axis in an opposite second pivoting direction.

6. The vehicle seat according to claim 1, wherein the pan adjusting device is configured to adjust an inclination of the seat pan part with respect to the seat part.

7. The vehicle seat according to claim 1, wherein the vehicle seat comprises at least one frame part which forms both part of a backrest frame of the backrest and part of a seat substructure of the seat part.

8. The vehicle seat according to claim 7, wherein the vehicle seat comprises a one-part seat frame which forms both the backrest frame and the seat substructure of the seat part carrying the seat pan part.

9. The vehicle seat according to claim 1, wherein the vehicle seat is designed without fittings.

10. The vehicle seat according to claim 1, wherein the vehicle seat comprises a seat height adjusting device.

11. The vehicle seat according to claim 10, wherein the seat height adjusting device is at least one of electronically and mechanically coupled to at least one of the pan adjusting device and a device for adjusting the inclination of the backrest.

12. The vehicle seat according to claim 1, wherein the vehicle seat is designed as a reclining seat or as a seat having an integrated seat belt.

\* \* \* \* \*